(12) United States Patent
Joh

(10) Patent No.: US 12,514,739 B2
(45) Date of Patent: Jan. 6, 2026

(54) WEARABLE URINARY COLLECTION APPARATUS

(71) Applicant: William Kyungha Joh, West Bloomfield, MI (US)

(72) Inventor: William Kyungha Joh, West Bloomfield, MI (US)

( * ) Notice: Subject to any disclaimer, the term of this patent is extended or adjusted under 35 U.S.C. 154(b) by 400 days.

(21) Appl. No.: 18/107,726

(22) Filed: Feb. 9, 2023

(65) Prior Publication Data
US 2023/0270584 A1    Aug. 31, 2023

Related U.S. Application Data

(60) Provisional application No. 63/372,241, filed on Feb. 28, 2022.

(51) Int. Cl.
*A61F 5/453* (2006.01)
*A61F 5/44* (2006.01)

(52) U.S. Cl.
CPC ............ *A61F 5/453* (2013.01); *A61F 5/4408* (2013.01)

(58) Field of Classification Search
CPC ....... A61F 5/453; A61F 5/4408; A61F 5/4556
See application file for complete search history.

(56) References Cited

U.S. PATENT DOCUMENTS

| | | | | |
|---|---|---|---|---|
| 3,724,461 A | * | 4/1973 | Eisenberg | A61F 5/4405 383/44 |
| 3,822,720 A | * | 7/1974 | Souza | F16K 15/1401 417/478 |
| 4,022,213 A | * | 5/1977 | Stein | A61F 5/453 604/350 |
| 4,239,044 A | | 12/1980 | Pavlinch | |
| 4,364,510 A | * | 12/1982 | Buchanan | B65D 31/142 383/54 |
| 4,387,726 A | * | 6/1983 | Denard | A61F 5/453 604/350 |
| 4,416,308 A | * | 11/1983 | Bower | B65D 31/14 383/57 |

(Continued)

FOREIGN PATENT DOCUMENTS

| | | | | | |
|---|---|---|---|---|---|
| CN | 113069268 A | * | 7/2021 | ............ | A61F 5/453 |
| CN | 215690284 U | | 2/2022 | | |

(Continued)

*Primary Examiner* — Adam Marcetich

(57) ABSTRACT

A wearable urinary collection apparatus includes an elongate, tubular, flexible, collection receptacle which receives and stores urine therein, a constriction formed at an intermediate position of the collection receptacle which defines a constricted opening at the intermediate position such that the urine which a user discharges into the collection receptacle must pass through the constricted opening, a short tubular member having opposite open ends and a diameter which is smaller than a diameter of the collection receptacle and having one of opposite open ends connected at the constriction in alignment with the constricted opening, and a check valve provided at the one of the opposite open ends of the tubular member adjacent to the constricted opening and which is configured to permit urine to freely pass from the constricted opening into the tubular member, and to block urine from flowing from the tubular member into the constricted opening.

12 Claims, 11 Drawing Sheets

(56) References Cited

U.S. PATENT DOCUMENTS

| | | | | |
|---|---|---|---|---|
| 4,449,243 A * | 5/1984 | Platel | ............... | B65D 81/2038 |
| | | | | 426/106 |
| 4,626,250 A * | 12/1986 | Schneider | ............... | A61F 5/453 |
| | | | | 604/350 |
| 4,994,051 A * | 2/1991 | Walsh | ............... | A61F 5/453 |
| | | | | 604/353 |
| 5,013,308 A | 5/1991 | Sullivan et al. | | |
| 5,067,821 A * | 11/1991 | Young | ............... | A61F 5/44 |
| | | | | 383/44 |
| 5,078,707 A | 1/1992 | Peter Klug | | |
| 5,084,037 A | 1/1992 | Barnett | | |
| 5,308,163 A * | 5/1994 | Abe | ............... | F16K 15/202 |
| | | | | 383/44 |
| 5,354,132 A * | 10/1994 | Young | ............... | A61J 19/00 |
| | | | | 383/44 |
| 5,380,312 A | 1/1995 | Goulter | | |
| 6,116,780 A * | 9/2000 | Young | ............... | A47K 11/02 |
| | | | | 383/44 |
| 6,223,751 B1 * | 5/2001 | Park | ............... | A61F 5/44 |
| | | | | 128/885 |
| 9,737,433 B2 | 8/2017 | Joh | | |
| 10,582,699 B1 | 3/2020 | Arthurs | | |
| 11,224,535 B2 | 1/2022 | Joh | | |
| 2008/0250554 A1 * | 10/2008 | Smith | ............... | A61F 5/453 |
| | | | | 4/144.2 |
| 2009/0062755 A1 * | 3/2009 | Burgess | ............... | A61M 1/69 |
| | | | | 604/326 |
| 2009/0163883 A1 * | 6/2009 | Christensen | ............ | A61F 5/441 |
| | | | | 604/328 |
| 2009/0238496 A1 * | 9/2009 | Liao | ............... | B65D 81/052 |
| | | | | 383/94 |
| 2010/0312203 A1 * | 12/2010 | House | ............... | A61F 5/4405 |
| | | | | 216/33 |
| 2012/0238976 A1 | 9/2012 | Foster | | |
| 2013/0144271 A1 * | 6/2013 | Passadore | ............... | A61F 5/44 |
| | | | | 604/328 |
| 2013/0206259 A1 * | 8/2013 | Liao | ............... | B65D 81/052 |
| | | | | 137/561 A |
| 2015/0080818 A1 * | 3/2015 | Sekiyama | ............... | A61F 5/453 |
| | | | | 604/353 |
| 2017/0216081 A1 | 8/2017 | Accosta | | |
| 2019/0314189 A1 * | 10/2019 | Acosta | ............... | A61F 5/449 |
| 2019/0374373 A1 * | 12/2019 | Joh | ............... | A61F 5/453 |
| 2020/0060946 A1 * | 2/2020 | Riese | ............... | A61J 19/02 |
| 2021/0228401 A1 * | 7/2021 | Becker | ............... | A61F 5/4401 |
| 2021/0401613 A1 | 12/2021 | Chiang | | |
| 2023/0020563 A1 * | 1/2023 | Sharma | ............... | A61F 5/443 |

FOREIGN PATENT DOCUMENTS

| | | | | | |
|---|---|---|---|---|---|
| CN | 216294402 U | * | 4/2022 | | |
| CN | 116531579 A | | 8/2023 | | |
| ES | 8505162 A1 | * | 4/1985 | ............ | B65D 31/145 |
| JP | 2006326052 A | | 12/2006 | | |
| WO | 2021026188 A1 | | 2/2021 | | |

* cited by examiner

WEARABLE URINARY COLLECTION APPARATUS

CROSS REFERENCE TO RELATED APPLICATIONS

This application claims priority under 35 USC § 119(e) from U.S. Provisional Patent Application No. 63/372,241, filed Feb. 28, 2022. The entire disclosure of each of the above-mentioned priority application(s) is incorporated herein by reference.

BACKGROUND OF THE INVENTION

1. Field of the Invention

The present invention relates to a wearable urinary collection apparatus for use by an active individual with urinary incontinence issues, which apparatus is configured to be inconspicuously and comfortably worn by the individual to collect and safely store urine voided by the individual, including means for preventing backflow and leakage, and which is easy and cost efficient to manufacture. More particularly, the present invention pertains to such wearable urinary collection apparatus which improves over conventional wearable urinary collection apparatus, as well as methods of making the same.

2. Description of the Background Art

There are many known apparatus for collecting voided urine resulting from incontinency. One type of the known apparatus is wearable adult size diapers having materials which absorb urine, and which are typically intended to be disposed of after a single use. Another type of the known apparatus includes some type of storage receptacle in which an individual's discharged urine is collected and stored, such that it may be disposed of when there is an opportunity to do so. The present invention pertains to this later type of the known apparatus.

The present inventor has previously proposed several different types of wearable urinary collection apparatus having a urine collection receptacle, including those discussed in U.S. Pat. No. 11,224,535 B2 to Joh (the '535 patent), the entire disclosure of which patent is incorporated herein by reference. Each of these previously proposed apparatus generally include a lightweight, tubular collection receptacle formed of thin plastic sheet material which is configured to receive and store urine therein, some type of backflow restricting/preventing means integrally provided with the collection receptacle, and means for conveniently and inconspicuously supporting the collection receptacle on an individual's body adjacent to the individual's penis such that the individual may readily void urine into the receptacle whenever the individual has need to do so.

a. Present FIGS. 1A to 3B correspond to some of the drawings in the '535 patent and depict the components of one of the inventor's previously proposed urinary collection apparatus. Of these drawings, FIG. 1A depicts an elongate, tubular, urine collection receptacle 100 which may be 30 to 80 cm long and 8 to 12 cm wide and which integrally includes a flowback preventing means provided with an elongate, tubular entrance port 102 that is attached within the collection receptacle 100 at or near one end of the receptacle, FIG. 1B shows a manner in which the structure of FIG. 1A is produced, FIGS. 2A, 2B depict a harness 104 which is configured to be secured around a user's waist and to support the collection receptacle adjacent to the user's penis so that the penis glans may be readily inserted into and/or remain in the entrance port while the collection receptacle extends downward from the harness so that urine discharged from the penis flows down through the entrance port into the receptacle where it is collected, and FIGS. 3A, 3B depict an elastomeric cap 110 that may be secured around the user's penis or penis glans such that when the penis glans is inserted into the entrance port, the elastomeric cap prevents urine that is being discharged into the entrance port from leaking out and without causing discomfort to the user. FIG. 1A also depicts a lower portion of a collection receptacle including a closable opening 107 which may be used to selectively empty any urine which has been collected in the receptacle and an elongate cord 109 which is connected at a lower end of the receptacle which may be used by an individual for manipulating the receptacle when desired. While the above discussion focuses on a male user having a penis, the '535 patent also discloses an adapter which permits the urinary collection apparatus to be used by females.

b. As disclosed in the '535 patent, the tubular collection receptacle 100 and the tubular entrance port 102 depicted in FIGS. 1A, 1B may be formed of plastic sheet material, e.g., any suitable type of plastic, plastic-like, rubber, elastomeric, or polymeric material(s), which material(s) may possess or be treated to possess anti-bacterial properties, including very thin sheet materials such as latex, thermoplastic polyurethane (TPU), various types of polyethylene including high density polyethylene (HDPE), low density polyethylene (LDPE), etc. TPU sheet material is more stretchable and elastic than polyethylene sheet material, and may be more suitable for use in the present invention as the increased stretchability and elasticity make the collection apparatus more resistant to tearing, and leaking, e.g., so that the receptacle or portions thereof can reliably expand as urine is flowed into it or as the receptacle is moved, sat upon or manipulated. The receptacle and entrance port may be relatively inexpensive to construct from such material(s), so that they may be disposed of after a single use/wearing, but are sufficiently durable that they may be cleaned and reused if desired. By constructing these components of plastic sheet material they are desirably lightweight and tend to be flat when empty.

c. Such plastic sheet material components and/or portions thereof may be readily bonded together using only heat or energy pulses. This is a convenient and inexpensive means for securing the entrance port 102 within the one end of the collection receptacle 100 without unduly constricting urine flow through either the entrance port 102 or the collection receptacle 100.

d. According to an important aspect of the previously proposed urinary collection apparatus, and as shown in FIGS. 1A, 1B, a unique flowback preventing means is integrally provided with the entrance port 102 in the form of constrictions 106 that are formed by bonding opposing surfaces of the entrance port together for significantly reducing the ID of the entrance port at one or more locations along its length as the entrance port extends into the collection receptacle, together with a so-called "flap" 108 which is an innermost portion of the entrance cap 102 that extends inward of an innermost one of the constrictions 106. Again, these constrictions may be conveniently and inexpensively formed using only heat or energy pulses, and may reduce the ID of the entrance port by 50% or more. The depicted embodiment includes four such constricted portions, which are aligned with each other at a center of the entrance port in the width direction. However, as discussed in the '535 patent the constricted portions may be provided in various numbers and in one or more shapes and sizes at various portions along the length of the entrance port.

e. While the entrance port 102 is securely fixed within the collection receptacle 100, as depicted in FIGS. 1A, 1B the innermost portion of the tubular entrance port, provided inward of an inner most one of the constrictions 106, forms a so-called "flap" 108 which can move to some extent relative to the collection receptacle, As disclosed in the '535 patent, such flap 108 is particularly effective for preventing backflow of urine through the entrance port 102, especially when the flap 108 is used in combination with the constrictions 106. The opposing walls of the flap will tend to remain engaged together other than when urine is flowing through the cap into the main body, and thereby prevents urine that has collected in the receptacle 100 from flowing back through the flap even if some pressure is applied to the receptacle when a user is active or is sitting or lying down. The inventor has determined that width and length of the flap are important for achieving optimum flowback prevention, while assuring the ability of urine discharged by a user to surely flow through the entrance port 102 into the collection receptacle 100. For example, the inventor has determined that when the entrance port including the flap 108 has a flat width of 8-9 cm and the flap has an axial length of 4-6 cm extending inward of the collection receptacle from the innermost one of the constrictions 106 which limits the ID of the flowpath at the constriction to 2.5-4 cm, this should be effective for preventing backflow of urine through the flap 108 and the entrance port 102 while permitting urine to surely flow through the entrance port into the collection receptacle 100. If the flap length is shorter than 4 cm it may not surely prevent backflow therethrough. A flap length is more than 6 cm may simply require additional material without providing any better flowback prevention. The cord 109 shown in FIG. 1A desirably permits a user to manipulate the lower portion of the receptacle when desired to prevent the receptacle from interfering with the user's movements, e.g., the user can move the lower portion of the receptacle and any urine contained therein to avoid the user sitting or lying on the receptacle and applying significant pressure on the receptacle.

f. The harness 104 previously proposed by the inventor for supporting the collection receptacle 100 on a user's body is shown in Referring to FIGS. 2A, 2B, with FIG. 2A depicting a perspective view of the harness not attached to a user and FIG. 2B showing manners in which the harness may be worn by a user. Generally, the harness includes an adjustable waist strap 112 which may be secured around a user's waist, a padded member 114 which is configured to extend downward from the waist strap in front of a user's genital area and to have the urine collection receptacle 100 secured thereto, and a pair of securing straps 116, each of which has one end connected to a lower end of the padded member and an opposite free end which may be selectively secured to various portions of the waist strap using an appropriate fastener, e.g., a hook-and-loop type fastener, a clip, a buckle, etc.

g. The waist strap 112 may be of any appropriate length, may include a fastener associated with free ends of the strap, e.g., a hook-and-loop type fastener, a clip, a buckle, etc., and may include means for adjusting the effective length of the waist strap. The waist strap may be formed of any appropriate material that will not cause any discomfort to the user even if the harness is worn by the user for an extended length of time. For example, it may be made of leather, fabric, elastic material, cushioning material, or a combination of two or more of these.

h. The padded member 114 may be shaped like an inverted U and provided to extend downward from the waist strap in front of a user's genital area, including a first portion that extends parallel along a portion of the waist strap and a pair of opposing arms that will extend at right angles to the first portion, and may have a size appropriate for covering the user's genital area, e.g., the first portion may be 8-12 cm long and 2-4 cm wide, and the arms may be 5-7 cm long and 2-4 cm wide. The padded member 114 may be formed of padded or cushioned material(s) that will not cause any discomfort or allergic reaction to a user and may be washed for reuse, e.g., fabric(s), foam covered fabric(s), etc. Also, the padded member may be provided with means 118 for securing a collection receptacle thereto, e.g., loops or hooks which are connected thereto and extend inward of the inverted U shape, such that the entrance port 102 within the collection receptacle may be conveniently disposed so that a user may readily insert his penis into the entrance port. The collection receptacle 100 and/or the entrance port 102 may be provided with straps (not shown) that may be tied or otherwise secured to the securing means 118 such that the entrance openings of these components are disposed directly in front of the user's genital area and such that the user may readily insert his penis into the entrance port 102 when desired.

i. The securing straps 116 of the harness may each generally comprise an elongate strip of material having one end secured to an end of one of the arms of the padded member 114 and having a fastener provided on the opposite end of the strap for securing the end of the strap to the waist strap 112, e.g., a hook-and-loop fastener, a clip, a button, etc., and intermediate portions of the straps 116 may be secured together with some type of fastener, e.g., thread which sews the straps together at the intermediate portions, a hook-and-loop fastener, a clip, etc. The material(s) used in forming the straps 116 may be the same as those used for making the waist strap 212 such as discussed above. As depicted in FIG. 2B, the straps 116 may be fastened to the waist strap 112 in various manners depending on the user's preference, e.g., the straps 116 may be arranged to fully overlap with each other and then may be extended between the user's legs adjacent to the user's genital area and having their free ends jointly fastened to the same portion of the waist strap, the free ends of the straps may be extended through the user's legs adjacent to the user's genital area and then separately secured to different portions of the waist strap, etc.

j. Referring to FIGS. 3A, 3B, FIG. 3A is a perspective view of the elastomeric cap 110 and FIG. 3B is a cross section of the cap along line B-B in FIG. 3A. The elastomeric cap 110 may be in the form of a cylindrical member constructed of soft flexible material such as a highly elastic polymer or polymer foam formed of silicone or other appropriate material which would be provided around a user's penis or penis glans so that when the penis glans is extended into the entrance port 102 the elastomeric cap 110 forms a leak-preventing seal with the inner surface of the entrance port 102. The elastomeric cap 110 may be generally cylindrical in shape with relatively thick walls of soft elastomeric material, with a central opening 120 extending axially therethrough and opposite end surfaces of the cap extending concave inward of the cap. The diameter of the central opening 120 may be any appropriate size that will snugly engage the user's penis or penis glans when the cap is provided on the penis, but without causing any discomfort to the user. For example the opening 120 may have a diameter of 1-2 cm, noting that the highly elastic material of the cap will stretch to increase the size of the opening to fit the penis. If desired a lubricant such as a hydrogel or the like may also be applied to surface(s) of the cap 200 which is inserted into the opening entrance of the collection receptacle to help prevent undesired flowback and seepage of urine. The degree of the concave shape of the opposite end surfaces of the cap 110 may be such that in cross section the two sides of the cap 110 extending from the central opening 120 appear like opposing isosceles triangles. With this shape the cap will only engage a small portion of the user's penis but will provide a much larger surface area for engagement with the inner surface of the entrance opening of the collection receptacle for preventing backflow and seepage.

k. As shown in FIG. 3B, the cap 110 may also include a baffle 122 provided in association with a discharge end of the central opening 120. The baffle 122 may include flap(s) of a flexible plastic material, e.g., TPU, HDPE, LDPE, LLDPE that extend from the end surface of the cap such that adjacent walls of the flaps will permit urine to flow downward therethrough, but which would otherwise remain engaged together or with the user's penis to prevent leakage of urine.

l. While such urinary collection apparatus previously proposed by the present inventor functions appropriately, there remains a need in the art for the known devices to be improved on in several respects. For example, while some of the inventor's previously proposed apparatus as depicted in FIGS. 1A-3B normally function very well to collect urine in the collection receptacle 100 and prevent urine from back flowing and/or otherwise leaking from the collection receptacle, the inventor has determined through experimental use of the previously proposed embodiments that there may be some situations where the apparatus does not sufficiently prevent backflow and/or leakage of urine form the collection receptacle, particularly when the user is engaged in activities or when the individual is sitting or lying down and the collection receptacle contains a relatively large amount of urine, e.g., eight or more fluid ounces. Further, the previously proposed backflow preventing means may also unduly inhibit urine which is being discharged into the apparatus from freely and reliably flowing into the collection receptacle of the apparatus, which can result in leakage of the urine. Also, the previously proposed structures for supporting the collection receptacle on an individual, including the harness 104 wearable about the individual's waist, could be improved in terms of reliability and convenience in use. Still further, the previously proposed apparatus could be improved on in terms of conveniently preventing leakage of urine as it is being discharged into the collection receptacle and while also avoiding any discomfort to the individual.

SUMMARY OF THE INVENTION

It is an object of the present invention to satisfy the discussed need.

The present inventor has carefully studied the known apparatus, and performed substantial research regarding the discussed need and has discovered several improvements to the known apparatus as discussed herein.

According to a first discovery, the inventor has determined that the entrance port 102 in his previous proposal, which was formed as a separate, elongate tubular member having the flowback preventing means integrally formed therewith and secured within one end portion of the collection receptacle 100, may not be necessary and the urinary collection apparatus may be further simplified by eliminating the entrance port. Instead of the entrance port, the inventor has determined that a leakage inhibiting entrance opening for a user's penis may be directly formed or attached at the one end portion of the collection receptacle while a simpler and more reliable flowback preventing means may be provided integrally with the collection receptacle.

For example, leakage inhibiting entrance opening may be easily formed at the one end portion of the collection receptacle by, for example, inserting a thin, planar and somewhat rigid member within one end portion of the collection receptacle, providing a small elastic band, e.g., a rubber band having a diameter of about 2 cm, around the portion of the collection receptacle having the thin, planar and somewhat rigid member therein so that the rubber band is near but spaced inward of one end of the collection receptacle, and then folding the one end of the receptacle back over the small elastic band and removing the thin, planar and somewhat rigid member such that the band is contained by the folded end portion of the receptacle and is situated at a new end of the receptacle to define the entrance opening. In this manner the small elastic band and the fold of the plastic sheet material forming the receptacle in which the band is contained become a constricted, but easily expandable entrance opening of the receptacle into which a user may directly insert his penis or penis glans. The elastic, expandable nature of this entrance opening as provided by the elastic band and stretchable plastic sheet material is advantageous for engaging the penis or penis glans with a small force sufficient to prevent urine which is being discharged by the penis from leaking out of the entrance opening, but without causing discomfort to the user's penis. If desired, a lubricant such as a hydrogel or the like may also be applied to surface(s) of the user's penis or penis glans before it is inserted into the expandable entrance opening to help prevent undesired seepage of urine and enhanced comfort. Also, while the expandable entrance opening may be directly formed at one end of the collection receptacle, it may be formed as a separate tubular member of plastic sheet material which is attached at one open end of the collection receptacle using heat or energy pulses.

The new flowback preventing means may include: a constriction formed in the collection receptacle which significantly reduces the ID of the collection receptacle at the position of the constriction so that urine discharged in the collection receptacle though the entrance opening will flow downward through the constriction for being collected in the receptacle; a small tubular member, e.g., 6-9 cm long and 1.5-3 cm wide, having open opposite ends and formed of plastic sheet material, which has one of its open ends secured to the collection receptacle at the constriction such that urine which passes through the constriction will also flow through the small tubular member; and a unique type of check valve also formed of plastic sheet material provided at the one end of the tubular member which is secured to the collection receptacle at the constriction. The check valve permits urine to freely pass further inward of the collection receptacle through the small tubular member, but blocks the urine from passing back up through the small tubular member and the constriction.

The small tubular member may be readily formed of plastic sheet material which is fixed into a tubular shape using heat of energy pulses similarly to the collection receptacle. While the ID of the small tubular member may be 1.5-3 cm, the inventor has found that the bore or lumen of the member is preferably ≤2.0 cm particularly at the end connected at the constriction. The plastic sheet material may be the same plastic sheet material used for forming the collection receptacle, but can be a different plastic sheet material and/or may have a different thickness than the material used in forming the collection receptacle. Again, TPU sheet material is preferred for forming each of these components because of its advantageous characteristics discussed herein. However, even if made of the same plastic material the small tubular member may have a smaller wall thickness than the collection receptacle because it is not required to contain any urine therein, unlike the collection receptacle, and will remain substantially flat or collapsed state at all times, including when urine discharged by a user is passing therethrough. For example, the collection receptacle may have a wall thickness of 0.0025-0150 mm (1-6 mil), while the small tubular member and the check valve may have a wall thickness of 0.0025-0075 mm (1-3 mil).

The unique check valve forming part of the flowback preventing means is a particularly important aspect of the present invention. Such check valve may be provided in the form of two, separate flaps of plastic sheet material which may each have one end secured at the constriction formed in the collection receptacle which significantly reduces the ID of the collection receptacle leading into the small tubular member such that the two flaps freely extend into the one connected end of the small tubular member, with the two flaps being respectively disposed on opposite sides of the constricted opening. Such flaps function as a check valve because when a user discharges urine into the collection receptacle entrance opening, the urine will readily pass through the constricted opening and between the two flaps into the small tubular member, but in the event of urine backflowing up through the small tubular opening for any reason, both flaps will tend to fold over the constricted opening to block the backflowing urine from passing back out of the small tubular member and through the constricted opening.

The flaps may be formed of the same plastic sheet material as used in forming the small tubular member, and may be conveniently and inexpensively formed integrally with the small tubular member. For example, the two flaps may initially be provided as one end of the small tubular member, two opposing slits may be formed in the one end portion of the tubular member so as to define the flaps, the two flaps may be folded inward of the one end of the tubular member, and when the one end of the small tubular member is attached at the constriction, the two flaps may also be secured at different parts of the constriction. The two flaps may be rectangular, square or some other shape, and may have different lengths, but each flap should be sufficiently long such that when it is folded in the direction of the constricted opening it can fully cover the constricted opening. For example, if the constricted opening of the collection receptacle at which the small tubular member is attached is 1 cm in diameter and each of the flaps is connected to the restriction 0.5 cm away from the constricted opening, each flap should have should have a length of at least 1.6 cm. If the two flaps have different lengths, e.g., one is 0.2 to 0.5 cm longer than the other, in the event of urine backflowing up through the small tubular opening, the shorter flap will tend to fold over the constricted opening first and the longer flap will then tend to fold over the first flap.

While backflow preventing means according to the present invention may comprise a single constriction and single tubular member having the unique check valve at one end, it is possible to provide a plurality of the constrictions formed in spaced positions from each other along the collection receptacle, and a plurality of the small tubular members and check valves provided with the constrictions, respectively. For example, each of the constrictions may be provided at the lateral center of the collection receptacle and spaced from each other by 7-10 cm along the length of the collection receptacle, with one of the small tubular members and one of the check valves provided at each of the constrictions. The inventor has determined through experimentation that two of the constrictions, each having one of the small tubular members and one of the check valves provided therewith, is very effective at preventing any backflow, even when the collection receptacle contains a relatively large amount of urine, e.g. ≥8 fluids ounces.

Additionally, the inventor has determined that if a manipulation cord or other member is provided at a lower end the receptacle, cord such as the cord 109 shown in FIG. 4, the cord can be easily used to manipulate the lower portion of the receptacle relative to the flowback preventing means to further assure positively prevent any flowback of urine in the receptacle. For example, the inventor has determined that if the cord is used to fold the lower portion of the receptacle relative to an intermediate portion of the receptacle inward of the flowback preventing means, the combination of the folded lower portion of the receptacle and the flowback preventing means is very effective for assuring that no flowback will occur.

According to a second discovery, the inventor has determined that the receptacle supporting harness disclosed in the '535 patent and duplicated in present FIGS. 3A, 3B may not always hold the collection receptacle at a position sufficiently close to a user's pubic area to permit the user to easily discharge urine in the receptacle at all times. After considerable research, the inventor has determined that an improved harness for supporting the urine collection receptacle for consistent convenience in use may include a waist strap that may secured about a user's waist, a pair of supporting straps that have opposite ends connected to different parts of the waist strap such that portions of the supporting straps extend on opposite sides of the user's pubic area and a short, e.g., 2-4 cm, bridge connection that connects intermediate portions of the supporting straps at a level of the user's inferior pubic tubercle. Such harness defines a substantially triangular area between the waist strap, portions of the supporting straps that extend from the waist strap and the short connection, such that the substantially triangular area closely surrounds the user's pubic area. The inventor has determined that if the collection receptacle is secured to the harness such that the entrance opening of the collection receptacle is supported by the supporting straps close to the short connection this will be effective for the user to easily discharge urine in the receptacle at all times.

The inventor has also determined that the urine collection apparatus may also include a supporting sleeve formed of fabric or the like to contain the collection receptacle for additional support and comfort to the user. Such a supporting sleeve may have an elongate tubular shape similar to the collection receptacle so that the collection receptacle fits securely therein but without restricting the ability of the receptacle to easily expand when it collects urine therein. The supporting sleeve may have one open end to which the open end of the collection receptacle may be secured, and a zipper or other fastener may be provided with a portion of the sleeve adjacent to the open end to permit the end to be selectively expanded to facilitate insertion and removal of the collection receptacle into and from the sleeve. Also, the open end of the supporting sleeve may include hooks, snaps, straps or the like which can be used to secure the open end of the collection receptacle to the open end of the sleeve and to secure the open end of the sleeve to the harness, and the size of the open end may of the supporting sleeve may be sufficiently large that a male user may insert his scrotum, as well as his penis or penis glans into the open end of the sleeve, which helps to maintain the open end of the collection receptacle, as disposed in the supporting sleeve conveniently close to the user's penis or penis glans therein. The open end of the collection receptacle is configured to comfortably receive only the user's penis or penis glans therein. The opposite end of the supporting sleeve may be closed or may include some type of closure that may be selectively opened or closed to expose the opposite end of the collection receptacle or a portion thereof.

According to a third discovery by the present inventor, the leakage preventing, short elastomeric cap 110 as shown in FIGS. 3A, 3B may not be sufficiently comfortable for a user to have provided around his penis or penis glans for an extended period of time. After during further research, the inventor has determined a more appropriate, leakage preventing cap for being provided around his penis or penis glans may be formed of a highly elastic, and tensile silicone gel material which is formed into a short tubular shape with opposite open ends. Such leakage preventing cap may be 2-5 cm long, and have an inner diameter of 1.5 to 3 cm and a wall thickness of 1-3 mm. With such construction the cap can be easily and comfortably fitted over most user's penis or penis glans such that the cap snugly engages the penis or penis glans, as well as the expandable entrance opening of the collection receptacle, to prevent urine from leaking out of the entrance opening, but will not create any discomfort for the user even if the cap remains on the user's penis or penis glans for an extended period of an hour or more.

a. The above advantages and other advantages and features of the present disclosure will be readily apparent from the following detailed description of the preferred embodiments.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

a. There have been chosen specific exemplary embodiments of a urinary collection apparatus according to the present invention and specific alternative structures and modifications thereto. The exemplary embodiments chosen for the purposes of illustration and description of the structure and method of the invention are shown in the accompanying drawings forming a part of the specification.

BRIEF DESCRIPTION OF THE DRAWINGS

FIGS. 1A, 1B depict an embodiment of a known urine collection receptacle previously proposed by the present inventor, which includes an elongate, tubular entrance port that is provided near an entrance opening of an elongate, tubular, urine collection receptacle, of which FIG. 1A is a cross sectional side view of the receptacle and entrance port and FIG. 1B shows some details of assembling the receptacle and entrance port together.

EXEMPLARY EMBODIMENTS

Figure 4:
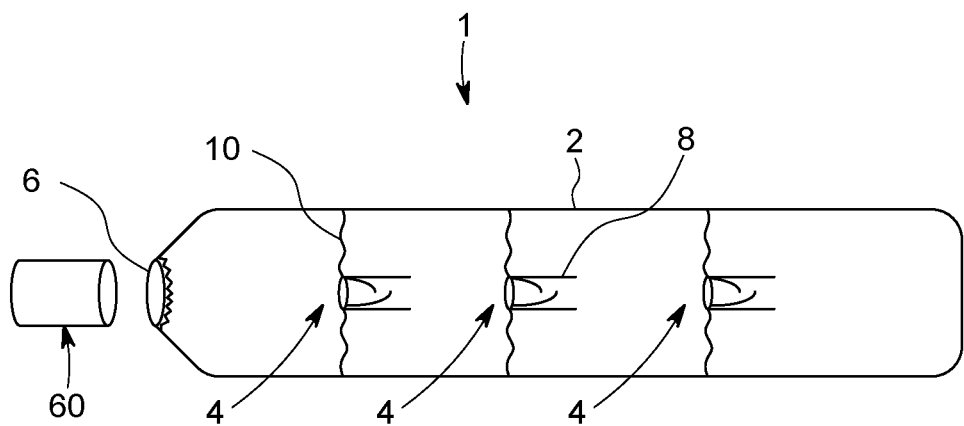
FIG. 4 is a cross sectional side view of an exemplary embodiment of a urine collection receptacle having an integral backflow preventing means according to the present invention.
Figure 5A:
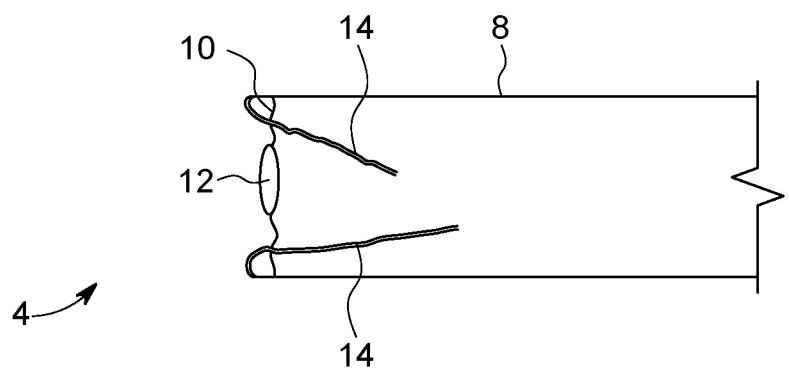
FIG. 5A is an enlarged, side cross sectional view showing a short tubular member which forms part of the flowback preventing means in FIG. 4 wherein the short tubular member has one end portion connected at a constriction formed at an intermediate portion of the urine collection receptacle and the one end portion of the short tubular member has slits cut therein to define two opposing flaps that extend within the short tubular member as a type of check valve that is also part of the flowback preventing means in FIG. 4.
Figure 5B:
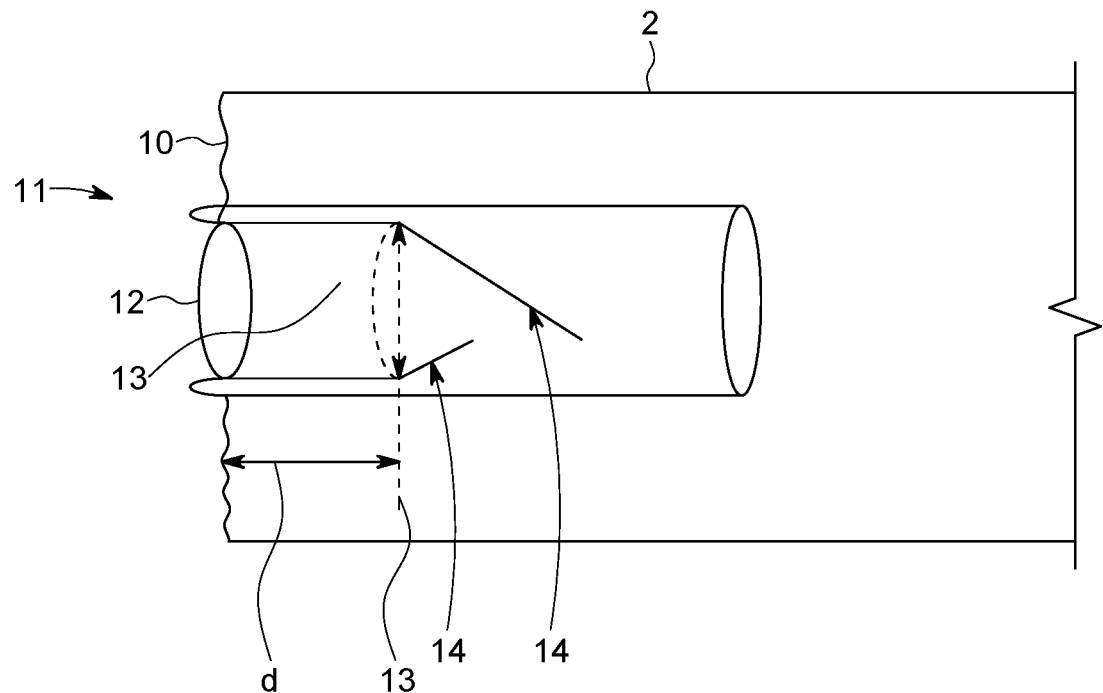
FIG. 5B is another enlarged, side cross sectional view showing the short tubular similarly to FIG. 5, but wherein the slits cut into the one end portion of the short tubular member are spaced inwardly of the short tubular member from the constriction.
Figure 6:
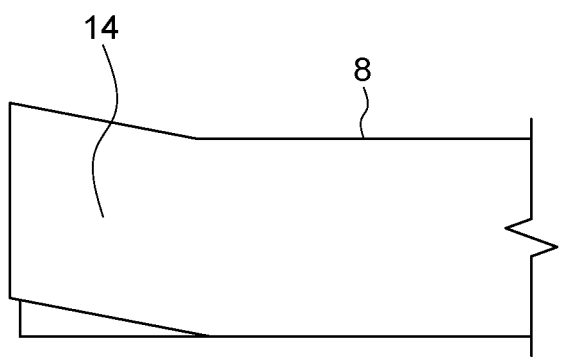
FIG. 6 is a side view of a short tubular member of FIG. 4 before it is attached to the collection receptacle as part of the flowback preventing means.

With reference to FIGS. 4-6, there is shown a wearable urinary collection apparatus 1 with integrated backflow prevention characteristics according to an exemplary embodiment of the present invention. The apparatus 1 may generally comprise an elongate, tubular urine collection receptacle 2 which may be formed with an expandable entrance opening 6 at one end thereof and an opposite end which may be closed or which may include a closable opening and/or a manipulation cord such as previously proposed by the inventor and shown in present FIG. 1A, and a new, improved flowback preventing means 4 integrally provided with the collection receptacle 2. The collection receptacle may, for example be 25-50 cm long and 8-15 cm wide, while the flowback preventing means 4 may include a smaller tubular member 8 which may be 6-9 cm long and 1.5-3 cm wide and connected within the collection receptacle 2 as discussed further herein. The apparatus 1 may also include a leakage preventing cap 60 which is simply fitted around the user's penis or penis glans, but not connected to the collection receptacle 2 or any other part of the urinary collection apparatus 1, as discussed further herein.

The tubular collection receptacle 1 and the flowback preventing means 4 may be formed of plastic sheet material, e.g., any suitable type of plastic, plastic-like, rubber, elastomeric, or polymeric material(s), which material(s) may possess or be treated to possess anti-bacterial properties, including very thin sheet materials such as latex, thermoplastic polyurethane (TPU), various types of polyethylene including high density polyethylene (HDPE), low density polyethylene (LDPE), etc. TPU sheet material is more stretchable and elastic than polyethylene sheet material, and may be more suitable for use in the present invention as the increased stretchability and elasticity make the collection receptacle 2 more resistant to tearing, and leaking, e.g., so that the receptacle or portions thereof can reliably expand as urine is flowed into it or as the receptacle is moved, sat upon or manipulated. The receptacle 2 and flowback preventing means 4 may be relatively inexpensive to construct from such material(s), so that they may be disposed of after a single use/wearing, but are sufficiently durable that they may be cleaned and reused if desired. Such plastic sheet material components and/or portions thereof may be readily bonded together using only heat or energy pulses, which is a convenient and inexpensive manner of bonding components together and for selectively forming constrictions in the components. By constructing these components of plastic sheet material they are desirably lightweight and tend to be flat when empty.

Figure 1A:
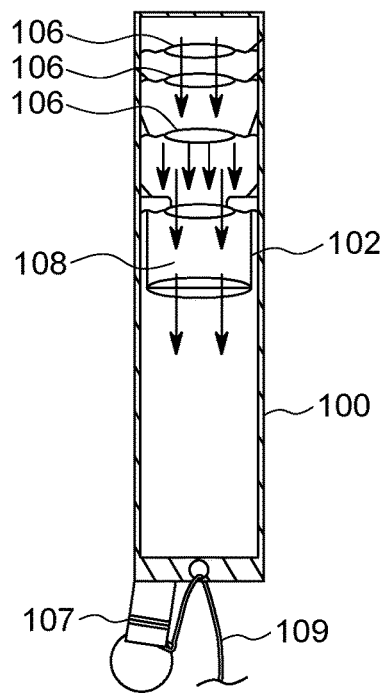
Figure 1B:
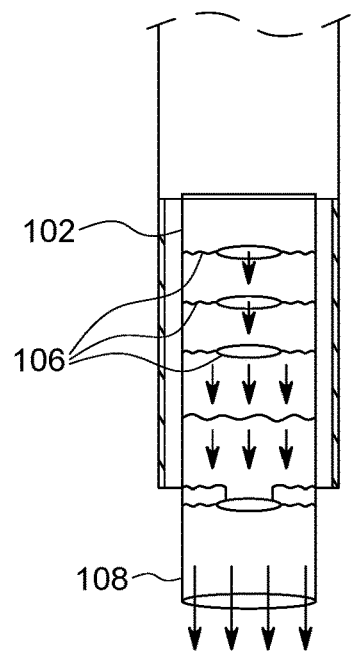
Figure 2A:
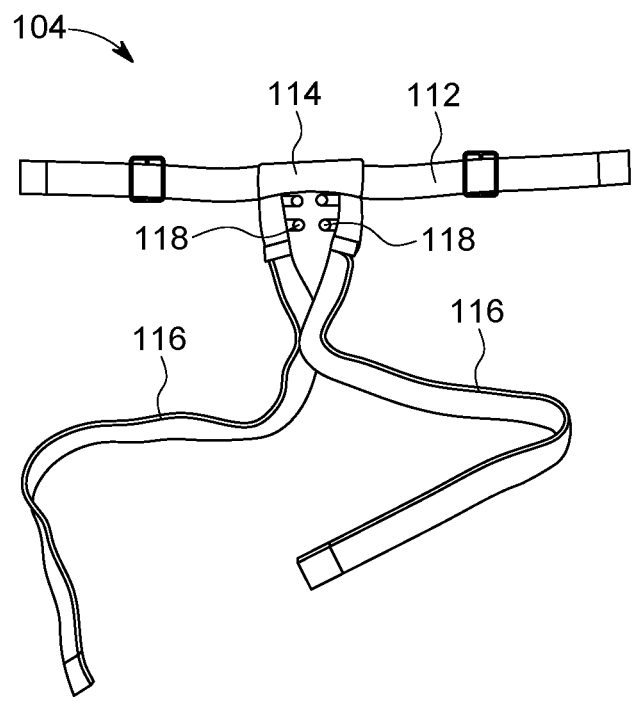
FIGS. 2A, 2B depict an embodiment of a known harness which is configured to be secured around a user's waist and to support the collection receptacle of FIGS. 1A, 1B adjacent to a user's penis so that the penis may be readily inserted into and/or remain in the entrance port while the collection receptacle extends downward from the harness so that urine discharged from the penis flows down through the entrance port into the receptacle where it is collected.
Figure 2B:
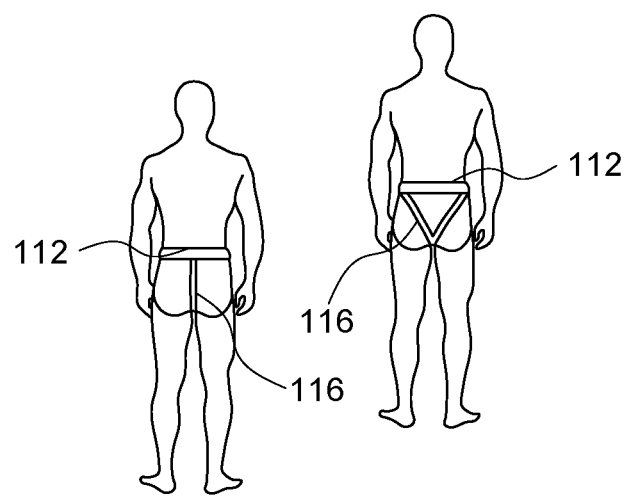

According to important aspects of the present invention, the inventor has determined that an expandable leakage inhibiting entrance opening 6 for a user's penis or penis glans may be directly formed or attached at the one end portion of the collection receptacle while the flowback preventing means 4 may have a simpler and more reliable structure than other flowback preventing means previously proposed by the inventor, such as the flowback preventing means included with the apparatus 100 shown in present FIGS. 1A, 1B.

The flowback preventing means 4 may include: a constriction 10 formed widthwise in the collection receptacle 2 which significantly reduces the ID of the collection receptacle at the position of the constriction to an opening 12 having an ID which may be ⅓ to ⅕ of the ID of the receptacle 2 where there is no constriction and so that urine discharged in the collection receptacle though the entrance opening will flow downward through the constriction for being collected in the receptacle; the small tubular member 8 which has open opposite ends, one of which may be secured to the collection receptacle at the constriction 10 such that urine which passes through the constricted opening 12 will also flow through the small tubular member 8; and a unique type of check valve 14 also formed of plastic sheet material provided at the one end of the tubular member which is secured to the collection receptacle at the constriction 10. The check valve 14 permits urine to freely pass further inward of the collection receptacle through the small tubular member, but blocks the urine from passing back up through the small tubular member and the constriction.

The small tubular member 8 may be readily formed of plastic sheet material which is fixed into a tubular shape using heat of energy pulses similarly to the collection receptacle. While the ID of the small tubular member may be 1.5-3 cm, the inventor has found that the bore or lumen of the member is preferably ≤2.0 cm particularly at the end connected at the constriction 10. The plastic sheet material may be the same plastic sheet material used for forming the collection receptacle, but can be a different plastic sheet material and/or may have a different thickness than the material used in forming the collection receptacle. Again, TPU sheet material is preferred for forming components of the apparatus 1 because of its advantageous characteristics discussed herein. However, even if made of the same plastic material the small tubular member 8 may have a smaller wall thickness than the collection receptacle because it is not required to contain any urine therein, unlike the collection receptacle 2, and will remain substantially flat or collapsed state at all times, including when urine discharged by a user is passing therethrough. For example, the collection receptacle 2 may have a wall thickness of 0.0025-0150 mm (1-6 mil), while the small tubular member 8 and the check valve 14 may have a wall thickness of 0.0025-0075 mm (1-3 mil).

The unique check valve 14 forming part of the flowback preventing means 4 is a particularly important aspect of the present invention. As shown in FIG. 5A, such check valve may be provided in the form of two, separate flaps of plastic sheet material which may each have one end secured at the constriction 10 formed in the collection receptacle such that the two flaps freely extend into the one connected end of the small tubular member from the constriction, with the two flaps being respectively disposed on opposite sides of the constricted opening 10. Such flaps function as a check valve because when a user discharges urine into the collection receptacle entrance opening, the urine will readily pass downward through the constricted opening and between the two flaps into the small tubular member 8, but in the event of urine backflowing up through the small tubular member for any reason, both flaps will tend to fold over the constricted opening 10 to block the backflowing urine from passing back out of the small tubular member 8 and through the constricted opening 10.

The flaps of the check valve 14 may be formed of the same plastic sheet material as used in forming the small tubular member 8, and may be conveniently and inexpensively formed integrally with the small tubular member. With reference to FIG. 6, for example, the two flaps may initially be provided as one end of the small tubular member by forming two opposing slits in the one end portion of the tubular member 8 in an axial direction of the small tubular member so as to define the flaps, the two flaps may be folded inward of the one end of the small tubular member, and when the one end of the small tubular member is attached at the constriction 10, the two flaps may also be secured at different parts of the constriction on opposite sides of the opening 12. Each of the two flaps may have a curved shape corresponding to about half of the small tubular member, but the flaps may be rectangular, square or some other shape, and may have different axial lengths so that they extend inward of the small tubular member by different the different lengths. However, each flap should be sufficiently long such that when it is folded in the direction of the constricted opening 12 it can fully cover the constricted opening. For example, if the constricted opening 12 is 1 cm in diameter and each of the flaps is connected at the constriction 10 about 0.5 cm away from the constricted opening 12, each flap should have should have a length of at least 1.6 cm. If the two flaps have different lengths, e.g., one is 0.2 to 0.5 cm longer than the other, in the event of urine backflowing up through the small tubular member 8, the shorter flap will tend to fold over the constricted opening 12 first and the longer flap will then tend to fold over the first flap. The rounded edges of the constricted opening 12 where the small tubular member is connected at the constriction 10 help to prevent the constricted opening from closing when a user has discharged urine into the collection receptacle 2 and the urine flows inward of the collection receptacle through the constricted opening for being collected in the collection receptacle.

Referring to FIG. 5B there is shown a small tubular member similar to the small tubular member in FIG. 5A, but wherein the attachment position of the end portion of the small tubular member at the constriction 10 is different from the attachment position of the end portion of the small tubular member in FIG. 5A such that the two flaps forming the check valve 14 are fully disposed within the one end of the small tubular member 8 and spaced away from the constriction 10 by a distance d. In other words, ends of the slits cut into the one end of the small tubular member to define the flaps of the check valve 14 end at the position 13 and are spaced away from the constriction by the distance d. With the check valve 14 of FIG. 5B a portion of the one end of the tubular member 8 extends inward of the small tubular member by the distance d, while the flaps of the check valve extend further inward of the small tubular member from the position 13. As with the embodiment shown in FIG. 15A each of the flaps of the check valve 14 should have sufficient axial length to fully cover the constricted opening 12, while one of the flaps may have a greater axial length than that of the other flap.

While the urinary collection apparatus 1 according to the present invention may include a single one of the backflow preventing means 4 comprising a constriction 10, small tubular member 8 and the unique check valve 14, it is possible to provide a plurality of the backflow preventing means 4 provided in spaced positions from each other along the collection receptacle. For example, each of the backflow preventing means 4 may be provided at the lateral center of the collection receptacle 2 and spaced from each other by 7-10 cm along the length of the collection receptacle 2. The inventor has determined through experimentation that two of the backflow preventing means 4, each having one of the constrictions 10, one of the small tubular members 8 and one of the check valves 14 provided therewith, is very effective at preventing any backflow, even when the collection receptacle contains a relatively large amount of urine, e.g. ≥8 fluids ounces.

Additionally, the inventor has determined that if a manipulation cord is provided at a lower end the collection receptacle 2, such as the cord 109 shown in FIG. 1A, the cord can be used to easily manipulate the lower portion of the collection receptacle relative to the flowback preventing means 4 to further assure positively prevent any flowback of urine in the receptacle. For example, the inventor has determined that if the cord 109 is used to fold the lower portion of the collection receptacle 2 relative to an intermediate portion of the receptacle that is positioned inward of the flowback preventing means 4, the combination of the folded lower portion of the collection receptacle and the flowback preventing means is very effective for assuring that no flowback will occur from the receptacle back up through the flowback preventing means 4.

Figure 7A:
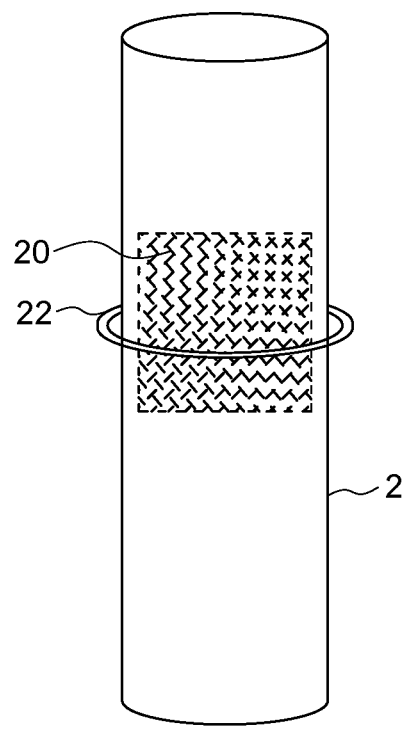
FIGS. 7A-7C are side views with some internal structure shown with broken lines showing how an expandable entrance opening may be formed at one end of a urine collection receptacle according to an exemplary embodiment of the present invention.
Figure 7B:
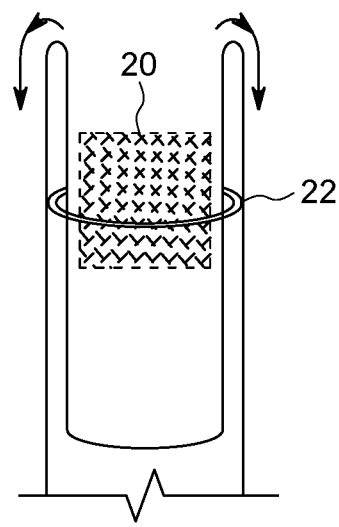
Figure 7C:
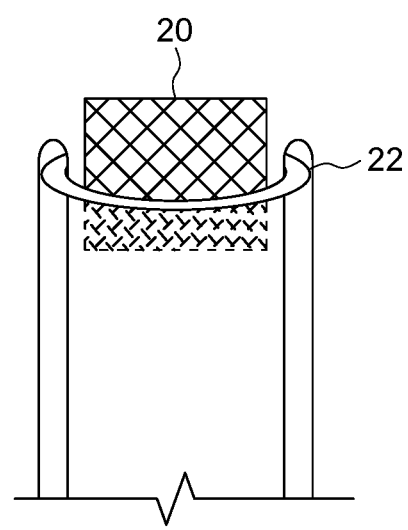

Referring to FIGS. 4 and 7A to 7C, the expandable, leakage inhibiting entrance opening 6 may, for example, be easily formed at the one end portion of the collection receptacle 2 in a manner as shown in FIGS. 7A to 7C. Initially, a thin, planar and somewhat rigid member 20 may be inserted within one end portion of the collection receptacle 2, but spaced away from the an end opening of the receptacle, and a small, thin gauge elastic band 22, e.g., a rubber band having a diameter of about 2 cm and thickness of 0.5-1.5 mm, may be provided around the portion of the collection receptacle having the thin, planar and somewhat rigid member therein so that the rubber band is near but spaced inward of one end of the collection receptacle as shown in FIG. 7A. Then, the one end of the collection receptacle 2 may be folded back over the small elastic band as shown in FIGS. 7B, 7C. The thin, planar and somewhat rigid member 20 may then be removed from the receptacle such that the band is contained by the folded end portion of the receptacle and is situated at a new end of the receptacle to define the expandable entrance opening 6 shown in FIG. 4. In this manner, the small, thin gauge elastic band and the fold of the plastic sheet material forming the receptacle in which the band is contained become the constricted, but easily expandable entrance opening 6 of the receptacle into which a user may directly insert his penis or penis glans. The elastic, expandable nature of this entrance opening as provided by the elastic band 22 and stretchable plastic sheet material is advantageous for engaging the penis or penis glans with a small force sufficient to prevent urine which is being discharged by the penis from leaking out of the entrance opening, but without causing discomfort to the user's penis. If desired, a lubricant such as a hydrogel or the like may also be applied to surface(s) of the user's penis or penis glans before it is inserted into the expandable entrance opening to help prevent undesired seepage of urine and enhanced comfort.

Figure 8:
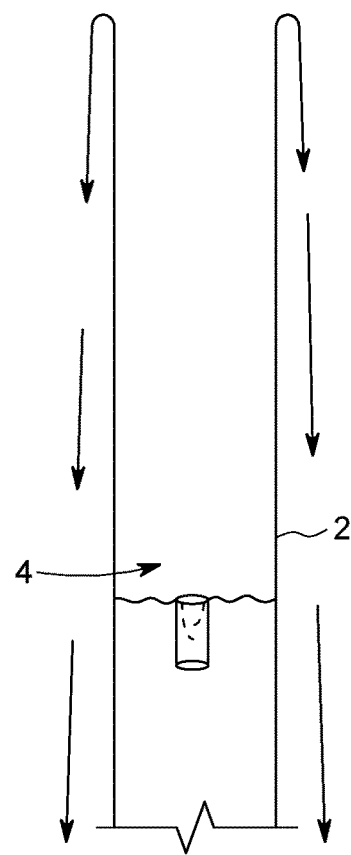
FIGS. 8-11 are side views showing how the urine collection receptacle with integral backflow preventing means of FIG. 4 may be constructed according to an exemplary embodiment of the present invention.
Figure 9:
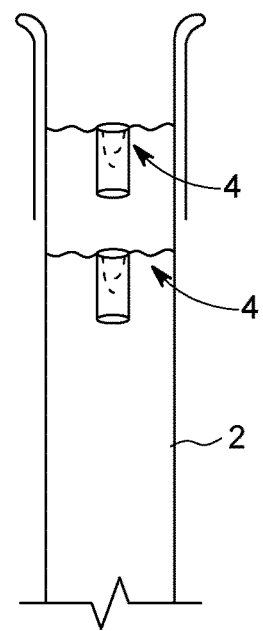
Figure 11:
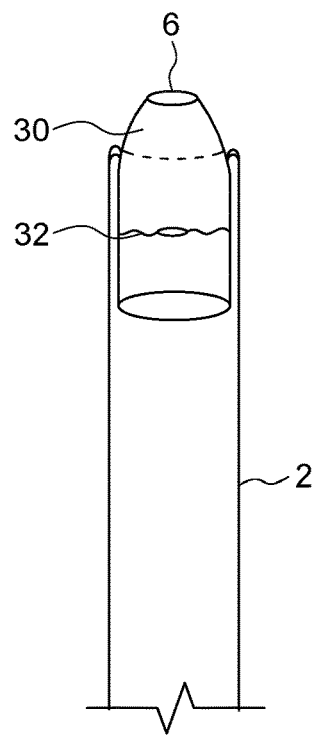
Figure 12:
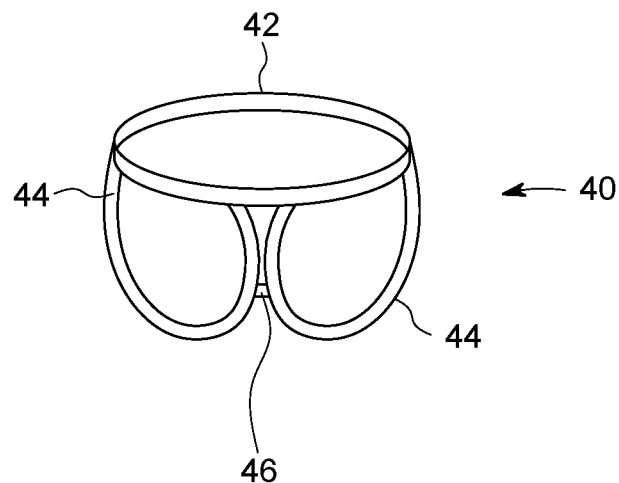
FIG. 12 is a perspective view of an exemplary embodiment of a harness used to support a urine collection receptacle according to the present invention.
Figure 13:
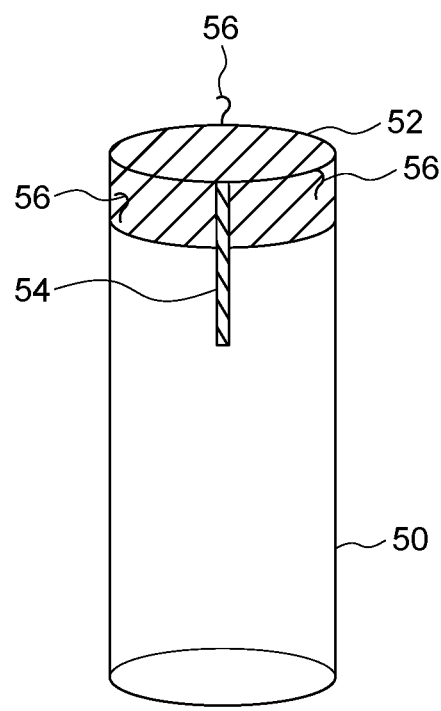
FIG. 13 is a front perspective view of a supporting sleeve for a urine collection receptacle according to an exemplary embodiment of the present invention.

Also, while the expandable entrance opening 6 may be directly formed at one end of the collection receptacle 2, the entrance opening may be formed as a separate tubular member of plastic sheet material which is attached at one open end of the collection receptacle using heat or energy pulses. With reference to FIGS. 8-11, for example, there is shown another manner in which a urinary collection apparatus according to an embodiment of the present invention may be formed. In FIG. 8, one open end of a collection receptacle 2 is folded back over an intermediate portion of the receptacle and a first flowback preventing means 4, including a constricted opening 12, a small tubular member 8 and a check valve 14 is provided at one axially inward position along the collection receptacle. In FIG. 9, a part of the one end of the collection receptacle that had been folded over is moved back toward its original position and a second flowback preventing means 4, including a constricted opening 12, a small tubular member 8 and a check valve 14 is provided at another position along the collection receptacle which is less axially inward than the position of the first flowback preventing means 4. At this time, the remaining folded portion of the one end of the collection receptacle extends axially away from the second flowback preventing means 4 and defines a new open end of the receptacle. The new open end may extend out slightly in a lateral direction from the rest of the collection receptacle, and this is shown in a somewhat exaggeratedly large shape in FIG. 9. Such new end of the collection receptacle, including folded layers of the plastic sheet material, has enhanced strength compared to other portions of the collection receptacle which include only a single layer of the plastic sheet material, and may be useful for supporting the collection receptacle on a user's body through a harness such as shown in FIG. 12 and/or a supporting sleeve as shown in FIG. 13, as discussed further herein.

Figure 10:
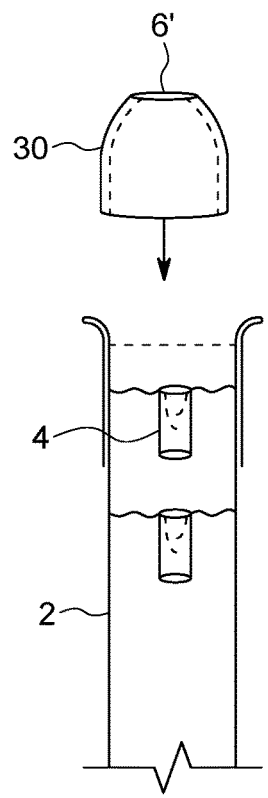

In FIG. 10 an expandable entrance opening 6' is not formed directly into the one end of the collection receptacle 2, as is done in the embodiment of FIGS. 4 and 7A-7C, but rather the entrance opening 6' is initially provided in a separate member 30, which is formed of plastic sheet material such as used in forming the collection receptacle 2, and then the separate member 30 is attached to the collection receptacle 2 at its one open end using heat, energy pulses, adhesive or other appropriate means. The separate member 30 having the expandable entrance opening 6' may be formed similarly to how the expandable entrance opening 6 is formed with reference to FIGS. 7A to 7C using a small gauge, elastic band 22, a planar, somewhat rigid member 20 and a short tubular member formed of plastic sheet material having an ID corresponding to that of the collection receptacle 2, e.g., the planar, somewhat rigid member 20 may inserted into the tubular member, the elastic band may be placed around the tubular member where the member 20 is located, the tubular member may be folded itself from one end toward the other, and then the member 20 may be removed, thereby defining the expandable entrance opening 6' at one end of the folded tubular member. When the separate member 30 is connected to the open end of the collection receptacle 2, a lower open end of the member 30 opposite to the expandable entrance opening 6', may be connected to the open upper end of the collection receptacle slightly inward of the edge of open end where the broken line extends in FIG. 10 using heat, energy pulses or the like and such that the lower end of the folded tubular member is spaced away from the closest one of the backflow preventing means 4.

The connection between the separate member 30 and the collection receptacle 2 may not create any constriction to the ID of the collection receptacle such as in FIG. 10, but it is possible to create a constriction at such connection. For example, FIG. 11 shows a modification to structure of FIG. 10 wherein the separate member 30 is connected to the collection receptacle 2 at an axially intermediate part of the separate member via a constriction 32 which reduces the ID of the collection receptacle to about ⅓ to ⅕ of its original size, and such that a portion of the separate member apposite to the expandable opening 6' extends inward of the constriction 32. With this modification, the constriction 32 and the lower portion of the separate member may act as a type of backflow preventing means with or without one or more of the backflow preventing means 4 disposed inward of the separate member 30 within the collection receptacle 2.

Supporting Harness and Supporting Sleeve

Figure 3A:
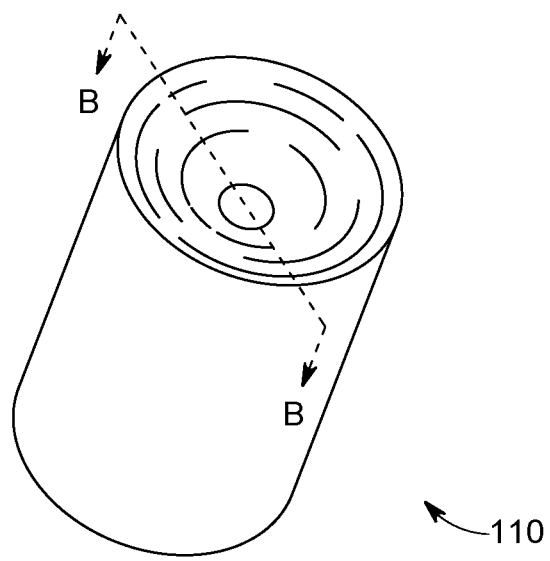
FIGS. 3A, 3B depict an embodiment of a known elastomeric cap that may be secured around the user's penis or penis glans such that when the penis glans is inserted into the entrance port of FIG. 1A, the elastomeric cap prevents urine that is being discharged into the entrance port from leaking out and without causing discomfort to the user.
Figure 3B:
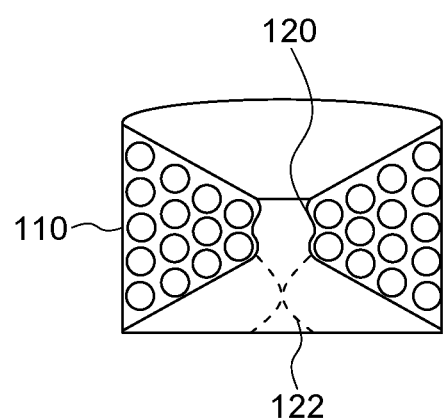

The inventor has determined that the receptacle supporting harness disclosed in the '535 patent and duplicated in present FIGS. 3A, 3B may not always hold an elongate, tubular collection receptacle such as the receptacle 2 at a position sufficiently close to a user's pubic area to permit the user to easily discharge urine in the receptacle at all times. After considerable research, the inventor has conceived of an improved harness for supporting an elongate, tubular collection receptacle such as the receptacle 2 for consistent convenience in use may, an exemplary embodiment of which is shown in FIG. 12. The supporting harness 40 in FIG. 12 includes a waist strap 42 that may secured about a user's waist, a pair of supporting straps 44 that have opposite ends connected to different parts of the waist strap such that when a user wears the harness portions of the supporting straps 44 extend on opposite sides of the user's pubic area, and a short, e.g., 2-4 cm, bridge connection 46 that connects intermediate portions of the supporting straps at a level of the user's inferior pubic tubercle. Such harness defines a substantially triangular area between the waist strap 42, portions of the supporting straps 44 that extend from the waist strap and the short bridge connection 46, such that the substantially triangular area closely surrounds the user's pubic area. The inventor has determined that if the collection receptacle 2 is secured to the harness such that the expandable entrance opening 6 of the collection receptacle is supported by the supporting straps and/or the short bridge connection 46 this will be effective for the user to easily discharge urine into the receptacle at all times.

Again, while the urinary collection apparatus has been discussed as being used by male persons, it may also be used by females, and this typically involves use of an adapter. Appropriate adapters have been previously proposed by the present inventor in the '535 patent, e.g., see FIGS. 3A-3E of the '535 patent, and such adapters may be used together with the urinary collection apparatus 1 according to the exemplary embodiment of the present invention. The inventor has determined that the harness 40 may also be used by females, but for such use it may be desirable to modify the harness by addition of a second short bridge connection (not shown) which is the same or similar to the short bridge connection 46. Such second short bridge connection may also be connected to the supporting straps 44 such that it extends in parallel to the short connection 46 but spaced away from the short connection by about 2-4 cm. With such modified harness including the second short connection, a discharge end of the female adapter may be extended between the two short connections and into the expandable entrance opening 6 of the collection receptacle.

The collection receptacle 2 may be directly supported by the harness 40, e.g., by securing an edge of the collection receptacle which surrounds the entrance opening 6 in FIG. 10 to the supporting straps 44 and/or the short connection 46 using any appropriate fastening means. The inventor has determined that if the expandable entrance opening 6 is disposed closely adjacent to the supporting straps 44 and/or the short connection 46 this will be effective for assuring convenience in use.

Figure 14:
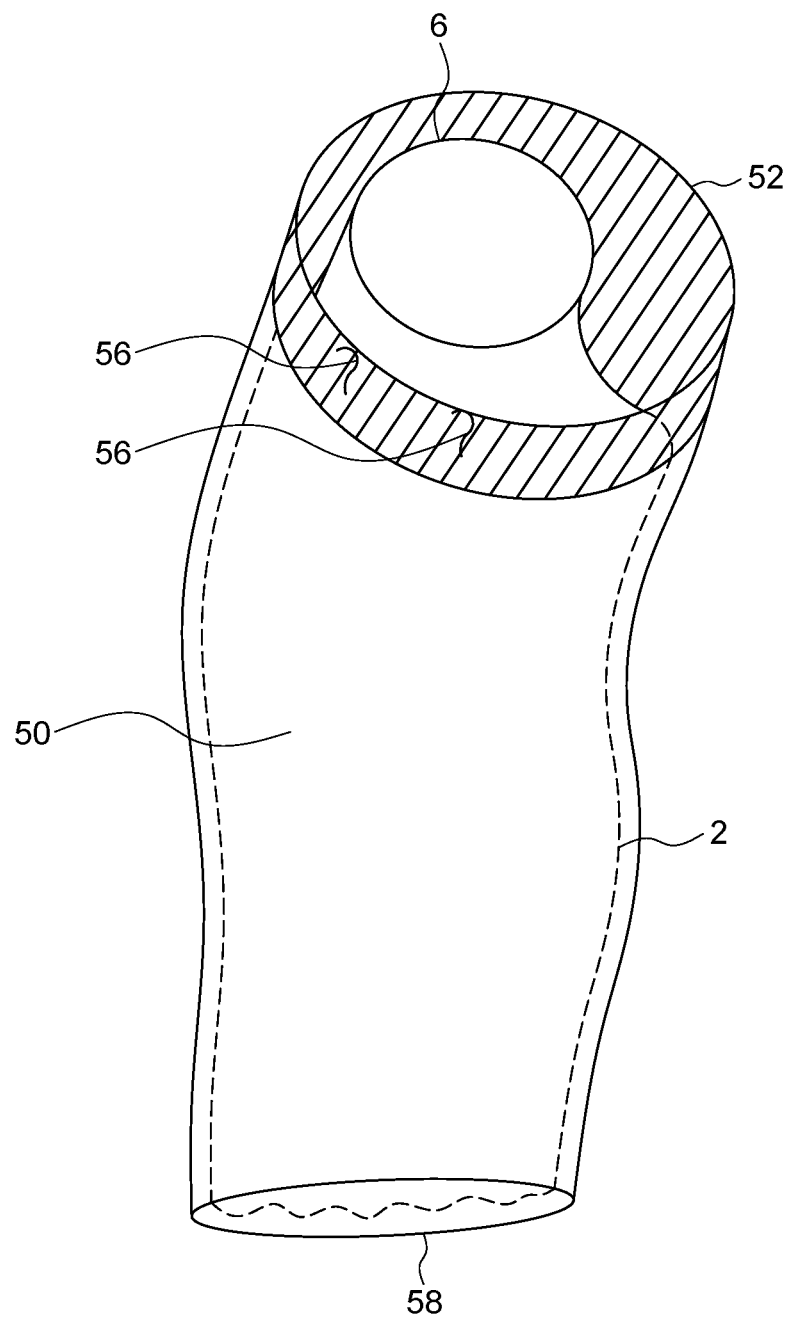
FIG. 14 is another perspective view of the supporting sleeve of FIG. 13 showing how the entrance opening of the collection receptacle may be supported in a non-coaxial manner within the entrance opening of the supporting sleeve, which creates a space for a user to also insert his scrotum into the upper portion of the supporting sleeve.

The inventor has also determined that the urinary collection apparatus 1 may also include a supporting sleeve formed of fabric or the like to contain the collection receptacle for additional support and comfort to the user. An exemplary embodiment of such a supporting sleeve 50 is shown in present FIGS. 13 and 14. As shown, the supporting sleeve 50 may have an elongate tubular shape similar to the collection receptacle 2 so that the collection receptacle fits securely therein but without restricting the ability of the receptacle to easily expand when it collects urine therein. The supporting sleeve may have a first open end 52 to which the open end of the collection receptacle 2 may be secured, and a zipper 54 or other fastener may be provided with a portion of the sleeve adjacent to the first open end 52 to permit the end to be selectively expanded to facilitate insertion and removal of the collection receptacle into and from the sleeve. Also, the first open end 52 of the supporting sleeve may include hooks, snaps, straps, hook-and-loop fasteners or other appropriate fasteners 56 which can be used to secure the open end of the collection receptacle to the open end of the supporting sleeve and to secure the open end of the sleeve to the harness. The size of the first open end 52 of the supporting sleeve may be sufficiently large that a male user may insert his scrotum, as well as his penis or penis glans, into the first open end of the sleeve, and this may help to maintain the open end of the collection receptacle, as disposed in the supporting sleeve, conveniently close to the user's penis or penis glans therein. As shown in FIG. 14, for example, the expandable open end 6 of the collection receptacle 2 may be secured non-coaxially within the first open end 52 of the supporting sleeve 50 such that part of the first open end 52 does not have any part of the expandable open end 6 disposed therein and remains open so that the user may readily insert his scrotum into the supporting sleeve 50 through such part of the first open end 52. The inventor has determined that inserting and maintaining one's scrotum into the first open end of the supporting sleeve in this manner does not create any discomfort for the user. The opposite end 58 of the supporting sleeve may be open as depicted to permit easy access to the lower end of the collection receptacle. Alternatively, the opposite end of the sleeve 50 may be closed or may include some type of closure that may be selectively opened or closed to expose the opposite end of the collection receptacle or a portion thereof.

The inventor has also determined that the urinary collection apparatus 1 may also a more reliable and comfortable leakage preventing cap 60 for being provided around a user's penis or penis glans prior to the penis or penis glans being inserted into the expandable entrance opening 6, such as shown in FIG. 5. Such leakage preventing cap 60 is a separate member which is simply fitted around the user's penis or penis glans, but not connected to the collection receptacle 2 or any other part of the urinary collection apparatus 1. The leakage preventing cap 60 may be formed of a highly elastic, and tensile silicone gel material which is formed into a short tubular shape with opposite open ends. Such leakage preventing cap 60 may be 2-5 cm long, and have an inner diameter of 1.5 to 3 cm and a wall thickness of 1-3 mm. With such construction the cap can be easily and comfortably fitted over most user's penis or penis glans such that the cap snugly engages the penis or penis glans, as well as the expandable entrance opening of the collection receptacle, to prevent urine from leaking out of the entrance opening, but will not create any discomfort for the user even if the cap remains on the user's penis or penis glans for an extended period of an hour or more.

a. While the exemplary embodiments of the present invention have been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications. For example, while the several exemplary embodiments of the urinary collection receptacle discussed herein are all discussed as being formed of thin, flexible plastic film/sheet material and perhaps also including support rings formed of rigid or semi-rigid materials, the present invention is not limited thereto.

I claim:

1. A wearable urinary collection apparatus, comprising: an elongate, tubular, flexible, collection receptacle which receives and stores urine therein, including an entrance opening near one end thereof which is configured to receive a penis of a user therethrough so that urine discharged from the penis will flow into the collection receptacle;

a plurality of constrictions formed at intermediate positions along the collection receptacle, each of the constrictions defining a constricted opening at its intermediate position, wherein each constricted opening has a diameter which is smaller than an inner diameter of the collection receptacle and such that the urine which the user discharges into the collection receptacle must pass through each constricted opening to pass further inward of the collection receptacle from the constrictions;

wherein each intermediate position includes a tubular member having opposite open ends and a diameter which is smaller than the inner diameter of the collection receptacle, the tubular member being shorter than the collection receptacle and having one of the opposite open ends thereof extending through each intermediate position of the collection receptacle in alignment with its constricted opening such that the urine which passes through the constricted opening will pass into the tubular member; and wherein each intermediate position includes a check valve in axial alignment with the corresponding constricted opening and wherein each check vale is configured to permit the urine to freely pass through its corresponding constricted opening and into the collection receptacle, and to block the urine flowing out of the collection receptacle.

2. The wearable urinary collection apparatus according to claim 1, wherein each of the collection receptacle, and the check valve are constructed of plastic sheet material.

3. The wearable urinary collection apparatus according to claim 2, wherein each check valve includes two flaps of the plastic sheet material, wherein the two flaps are provided on opposite sides of each constricted opening and wherein each of the flaps extends inward of its corresponding constricted opening by an axial length which is longer than a sum of the diameter of the constricted opening and a distance from the constricted opening to the flap.

4. The wearable urinary collection apparatus according to claim 3, wherein each of the flaps has one end separately secured at its corresponding constricted opening and wherein the axial length of each of the flaps is longer than a sum of the diameter of the constricted opening and a distance from the constricted opening to the where the flap is secured at the constriction.

5. The wearable urinary collection apparatus according to claim 3, wherein each of the flaps is spaced inward of its corresponding constricted opening.

6. The wearable urinary collection apparatus according to claim 3, wherein the axial length by which one of the flaps extends inward of each constricted opening is longer than the axial length by which another of the flaps extends inward of the constricted opening.

7. The wearable urinary collection apparatus according to claim 1, further comprising an expandable entrance opening provided at the entrance opening near the one end the collection receptacle, which expandable entrance opening is configured to receive the user's penis therethrough, wherein the expandable entrance opening includes an elastic band that normally urges the expandable entrance opening to engage the user's penis.

8. The wearable urinary collection apparatus according to claim 1, further comprising a harness which is configured to be disposed about a waist of the user and which includes at least one fastener configured to secure the collection receptacle to a front portion of the harness such that the user may insert the user's penis into the entrance opening of the collection receptacle.

9. The wearable urinary collection apparatus according to claim 8, wherein the harness includes a waist strap configured to be worn about a waist of the user, a pair of supporting straps each having opposite ends connected to the waist strap so that the supporting straps extend on opposite sides of a pubic area of the user, and a bridge connection that connects intermediate portions of the supporting straps at a level of an inferior pubic tubercle of the user, wherein the bridge connection is 2-4 cm long and wherein the at least one fastener is provided on at least one of the bridge connection portions of the supporting straps adjacent to the bridge connection.

10. The wearable urinary collection apparatus according to claim 1, further comprising a tubular supporting sleeve in which the collection receptacle may be disposed when the collection receptacle is being worn by the user, wherein the tubular supporting sleeve has a first end which is open and which is configured to surround the entrance opening of the collection receptacle when the collection receptacle is disposed in the tubular supporting sleeve, and wherein the tubular supporting sleeve includes at least one fastener at the first end which is configured to secure the entrance opening of the collection receptacle to the first end.

11. The wearable urinary collection apparatus according to claim 10, wherein the at least one fastener at the first open end of the supporting sleeve is configured to support the entrance opening of the collection receptacle non-coaxially within the first open end of the supporting sleeve and to define an area of the first open end of the supporting sleeve adjacent to the entrance opening of the collection receptacle through which a scrotum of the user may be inserted into the tubular supporting sleeve.

12. The wearable urinary collection apparatus according to claim 1, wherein an opposite end of the collection receptacle has a closable opening provided therewith such that the opposite end of the tubular collection receptacle may be selectively opened or closed, and wherein the urinary collection apparatus further includes an elongate, flexible member provided at the opposite end of the tubular collection receptacle which is configured to be gripped and moved by the user for manipulating the opposite end of the tubular collection receptacle.

\* \* \* \* \*